April 2, 1940.  J. WHITING  2,195,527

WATER LOCOMOTION AND APPARATUS THEREFOR

Filed Oct. 29, 1937  3 Sheets-Sheet 1

INVENTOR
Jasper Whiting,
BY
ATTORNEY.

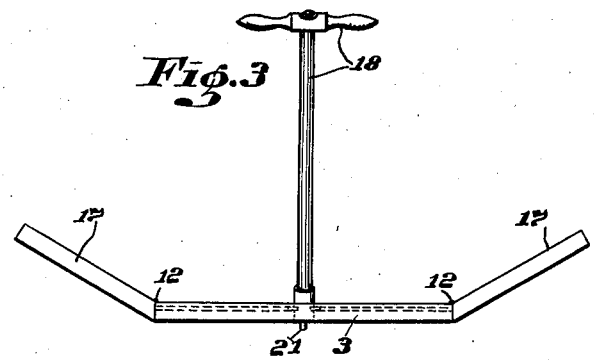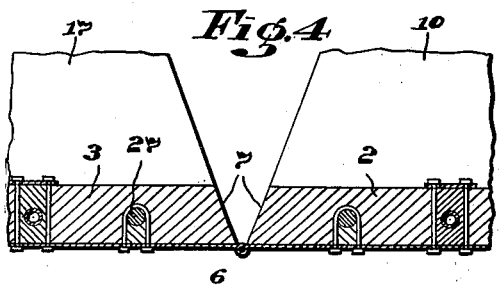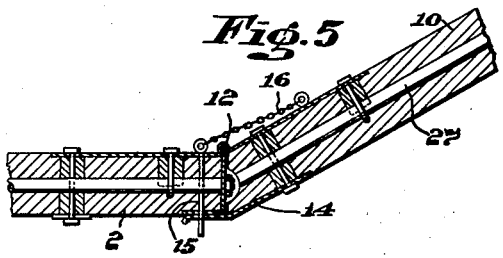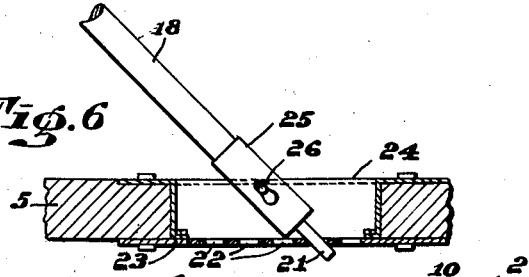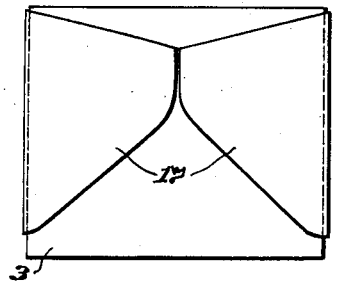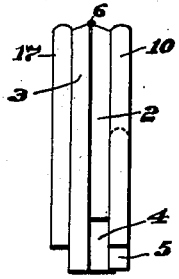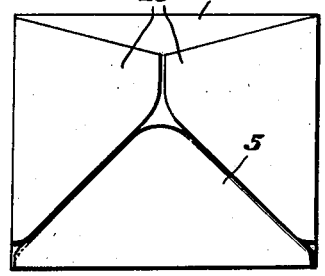

April 2, 1940.  J. WHITING  2,195,527
WATER LOCOMOTION AND APPARATUS THEREFOR
Filed Oct. 29, 1937  3 Sheets-Sheet 3

INVENTOR
Jasper Whiting,
BY
ATTORNEY.

Patented Apr. 2, 1940

2,195,527

UNITED STATES PATENT OFFICE 2,195,527

WATER LOCOMOTION AND APPARATUS THEREFOR

Jasper Whiting, Boston, Mass.

Application October 29, 1937, Serial No. 171,683

9 Claims. (Cl. 9—1)

This invention relates to water locomotion. It involves a novel apparatus utilizing floats of simple forms.

The nature of the invention will be readily understood from the following description when read in connection with the accompanying drawings, and the novel features will be particularly pointed out in the appended claims.

In the drawings,

Fig. 3 is a rear view of said apparatus;

Figure 1:
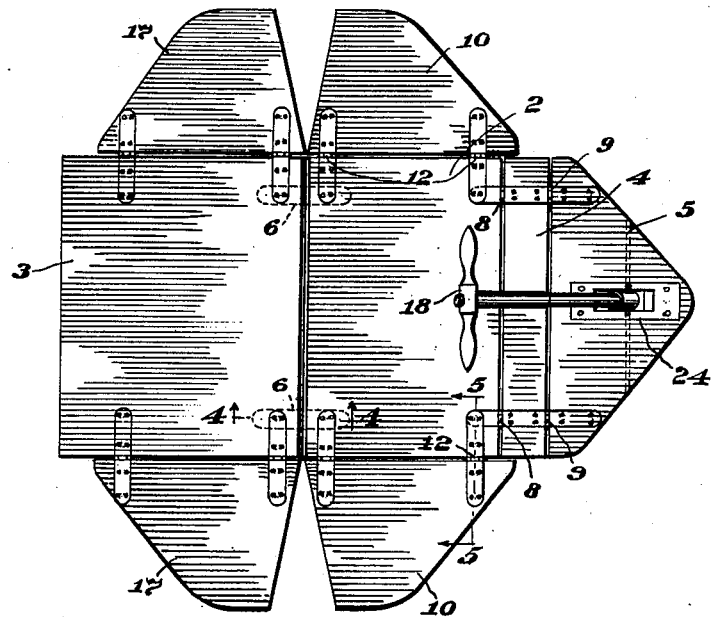
Figure 1 is a plan view of an apparatus constructed in accordance with this invention.

Figs. 4 and 5 are sectional views approximately on the lines 4—4 and 5—5, respectively, Fig. 1;

Fig. 6 is a vertical, sectional view showing details of the connection of the handle to one of the floats;

Figs. 7, 8 and 9 are views showing the manner in which the apparatus may be folded;

Figs. 10 to 15, inclusive, are diagrammatic views illustrating the manner in which the apparatus is designed to be used.

Figure 2:
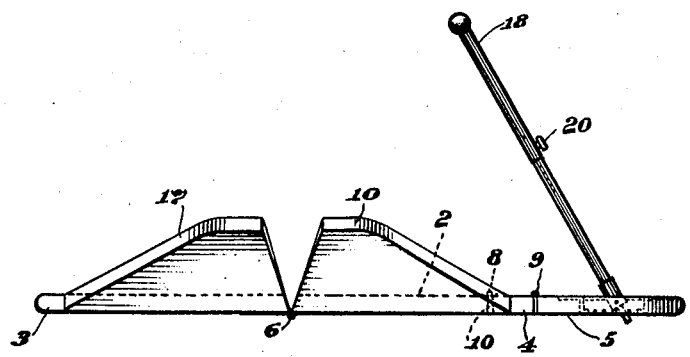
Fig. 2 is a side elevation of the apparatus shown in Fig. 1.

Referring first to Figs. 1 and 2, the construction there shown consists of a float or glider. In order to avoid confusion in terminology, the entire assembly will be referred to as a "glider" and those parts relied upon primarily for buoyancy will be designated as "floats."

The glider comprises two main floats, namely, a front float 2 and a rear float 3. In addition, it also includes supplemental floats or float sections 4 and 5. The two main floats 2 and 3 are connected together by hinges 6—6, Figs. 1, 2 and 4, so that they can have a restricted degree of relative swinging movement. The upward movement into positions above and below their common plane of horizontal alignment of these two parts relatively to each other is limited by the angle at which the adjacent edges 7 of the floats are cut. Similarly, the part 4 is connected to the float 2 by hinges 8—8 which permit it to swing upwardly but limit its downward swing to a relatively small extent say, for example, 10° or 12°. Also, the parts 4 and 5 are connected together by hinges 9—9 which permit the latter to swing upwardly but prevent any downward hinging movement of it relatively to the part 4.

Preferably the main float 2 is equipped with two wings 10—10 each secured to it by hinges 12—12, Figs. 1 and 5, so that both wings can be folded over upon the float. Normally, however, the wings are fastened rigidly to the float so that they move with it as an integral structure. While any suitable fastening means may be used for this purpose, a good arrangement is shown in Fig. 5 in which the wing 10 is provided with an angular plate 14 secured to its lower surface and having an extension which swings under the edge of the float 2 when the wing is in its normal position. A pin 15, extending through the entire edge structure of the wing and tethered by a chain 16, serves to lock the wing rigidly in its operative position. The same construction may be used at each of the other hinges. The rear float 3 also is equipped with wings 17—17 like those just described and secured in the same manner.

As best shown in Figs. 1, 2 and 6, a handle 18 is secured to the section 5 so that it is functionally rigid with the section and can be used to tip this float and to hold it in any desired angular position. Preferably this handle is made adjustable both vertically and angularly so that it can be mounted in the position best suited to the comfort and convenience of individual riders or operators. The height of the handle may be adjusted by making the shank of telescoping tubes secured together by any convenient means as, for example, the thumb screw 20, Fig. 2. In order to adjust its angle, it may be provided at its lower end with an extension 21 designed to fit into any one of a series of holes, such as those shown at 22, which are formed in a metal plate 23 bolted to the bottom of the float. The material of the float is cut away at this point to provide a slot for the shank of the handle and the edges of this slot are reinforced with a metal frame 24. The reinforcing sleeve 25 at the lower end of the handle is drilled to receive a transverse pin 26 which projects at opposite sides thereof, the ends of this pin extending into holes formed in the walls of the part 24 at opposite sides of the slot. Consequently, in order to move the handle into a different angle position or inclination, it is merely necessary to withdraw the pin 26 and then to lift the extension 21 out of its socket and then insert it in the socket designed to satisfy the user's requirements. The pin 26 then is replaced in its normal position.

All of the floats may be made of any suitable construction designed to support the weight of a man of normal build when the glider is floating in calm water. The degree of buoyancy can be such that the same glider can be used by individuals varying greatly in weight. A very satisfactory construction is provided by making these floats of balsa wood coated with some paint, varnish, or the like, which will substantially prevent the wood from absorbing water. Pyroxylin varnishes and the dopes used in airplane wing construction are well suited to this purpose. However, the invention is not limited to use with balsa wood floats, since they may be made of other woods in solid constructions, can be provided with air chambers to give them greater buoyancy, can be made of hollow metal floats, or fashioned any way capable of supporting the operator. When balsa wood is used, two inch planks of this material serve very satisfactorily. Sometimes it is desirable to reinforce them with light weight metal tubes or wood dowels, such as those shown at 27 in Figs. 4 and 5, to give them added transverse strength while at the same time forming a better anchoring means for the fastenings for the various connecting members. All such members preferably are made of some light weight metal, hard fiber, or of a stronger wood than balsa.

Figure 10:
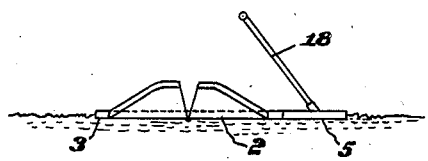

A typical method of using the glider is shown in Figs. 10 to 15. When resting on the surface of the water without a load, it floats approximately as shown in Fig. 10. When a rider steps on it, it sinks somewhat and the main floats 2 and 3 may tip slightly toward each other, depending largely on the position which he takes with reference to the centers of buoyancy of the sections. He should stand on the two main floats, with one foot on each float, each foot being approximately on the center of buoyancy of the respective float. These centers normally are practically in the geometrical centers of the respective floats. The end or leading section 5 is not designed to have any great buoyancy but is intended primarily to assist in controlling the movements of the front float and changing its angle when desired.

Figure 11:
Figure 12:
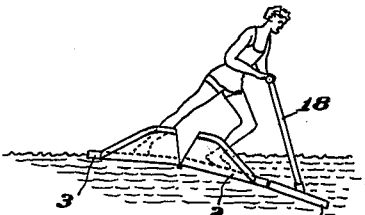
Figure 13:
Figure 14:
Figure 15:
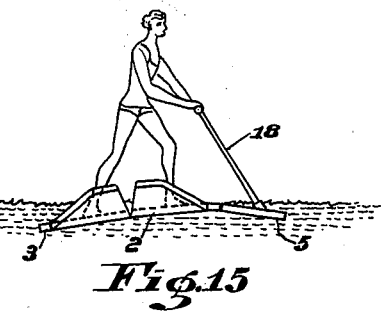

From a position of rest, as shown in Fig. 11, the rider first shifts his weight forward on to the front float 2, at the same time tipping the handle 18 forward so as to tilt the leading float 5 downwardly. The mere act of shifting the center of gravity of the rider into a position forward of the center of buoyancy of the front float 2, tips the forward edge of this float down and even if the leading float 5 were not there, would cause the front float to dive and produce a forward movement of the entire glider. This movement is aided by the leading float 5 and its connection with the front float 2 and by the tipping movement imparted to the member 5 through the handle 18. As the speed of the dive increases the rider pulls up slightly on the handle 18, thus levelling off the front float with its leading tip 5, approximately as shown in Fig. 13. At the same time he shifts his weight back toward the rear float. Here the center of gravity also is somewhat ahead of the center of buoyancy of the float 3, which has already been given a downward inclination by its connection with the front float, so that the forward movement is continued through this shift in weight and its action on the inclined plane of the rear float. Thus the forward propelling movement of the glider is augmented. Before this section levels out, the front plane 2 and its leading tip 5 are pointing upwardly, and the forward movement further is continued under the combined action of the momentum already acquired and the forces of buoyancy acting on the forward planes which are now directed upwardly toward the surface. Thus the glider carries through a levelling-out action, somewhat as shown in Fig. 15, at the surface of the water. This is immediately followed by another shift in weight on to the forward float, combined with a forward tilting of the tip 15, as shown in Fig. 12.

The cycle above described immediately is repeated. As these operations are continued with rhythmical regularity, suited to the action of the floats themselves, the glider gains speed and the rider moves forward over the surface of the water. He can easily travel at about a walking speed.

During these operations the wings 10 and 17 perform the very important function of substantially preventing a sidewise slipping or skidding of the glider. In addition to increasing its buoyancy they also serve to give it lateral stability. In this respect they perform much the same functions as a center board, although their entire action is superior to that of a center board. In fact, center boards may be used, either in their usual positions or two side boards may be extended downwardly from the edges of the floats to increase the resistance to lateral skidding. It should be observed that the wings are notched at practically the same angle as the surfaces 7, Fig. 4, so that they do not interfere with the normal, vertical, swinging movements of the floats relatively to each other.

It will be seen from the foregoing that the floats acts as floating planes, flexibly connected together in series, and that the propulsion of the glider is effected fundamentally by shifting the weight of the rider backward and forward with reference to the centers of buoyancy of the planes. The forward shift produces a forward dive of the front plane which is followed by an upward and forward surge of this plane. The rear float also is made to dive and rise in the same manner, its movements being so timed that it follows the corresponding movements of the front float. Thus it adds its forward impulse or surge to the momentum produced by the first float and before the movement created by or accompanying that momentum has died out. The third float 5 is made to perform essentially the functions of an elevator tip for the front float 2, and it is tilted first downwardly and then upwardly in synchronism with the shifting of the weight of the rider. While this tip thus performs valuable functions and it is included in the preferred embodiment of the invention because of that fact, nevertheless an entirely operative glider can be made without it, the handle being secured to the front float 2 and the front and rear floats being connected and operated in substantially the manner above described.

The glider can readily be steered by shifting the weight slightly toward the side to which the rider wishes to turn as the front plane makes its dive, then shifting to the opposite side as the plane rises, and continuing these movements, at the same time exerting some steering action through the handle.

Inasmuch as the glider is necessarily bulky, it is preferable to construct it so that it can be folded into a relatively compact form for transportation, and this is the reason for many of the hinges used. By pulling out the pins 15, Fig. 5, associated with the hinges for the wings 10 and 17, these wings may be folded over upon their respective floats 2 and 3 in the manner shown in Figs. 8 and 9. Also, the handle 18 may be pulled out of its socket and the tip 5 folded over upon the top of the front float 2 and the adjacent intermediate section 4, as shown in Figs. 7 and 9. Both main floats may then be swung backwardly on the hinges 6 until their lower surfaces are in contact with each other, as shown in Fig. 7, after which the whole assembly may be secured in its folded position by means of a strap.

While I have herein shown and described typical embodiments of my invention, it will be understood that the invention may be embodied in a great variety of forms without departing from the spirit or scope thereof.

Having thus described my invention, what I desire to claim as new is:

1. A water locomotion device adapted to support a rider and comprising two floats having plane surfaces, means connecting said floats together, one behind the other, for relative vertical swinging movement above and below their common plane of horizontal alignment, neither float alone being capable of floating the rider, whereby the rider may propel the glider by shifting his weight alternately from one float to the other and thus causing the forward edge of one float to sink and assume an inclined position with a resultant forward movement, followed by repeating the action on the second float with a consequent added forward movement before the momentum produced by the first forward impulse has died out.

2. A water locomotion device adapted to support a rider and comprising two floats having plane surfaces, means connecting said floats together, one behind the other, for relative vertical swinging movement above and below their common plane of horizontal alignment, the centers of buoyancy of said floats being so spaced apart that the rider can stand on them with one foot approximately on the center of buoyancy of each float, whereby he can tip said floats alternately in a forward direction by shifting a substantial part of his weight from one foot to the other.

3. An article according to preceding claim 2, in which one at least of said floats includes means offering substantial resistance to lateral slipping movement of the glider.

4. An article according to preceding claim 2, in which one at least of said floats is provided at its opposite lateral edges with substantially rigid upwardly extending wings.

5. A water glider adapted to support a rider and comprising two floats, means connecting said floats together, one behind the other, for relative vertical swinging movement, the centers of buoyancy of said floats being so spaced apart that the rider can stand on the glider with one foot approximately on the centers of buoyancy of each float, whereby he can tip said floats alternately in a forward direction by shifting a substantial part of his weight from one foot to the other, a third float of less buoyancy than the other two and connected to the forward edge of the front float for vertical swinging movement relatively thereto, and means for enabling the operator to control the tilt of said third float.

6. A water glider adapted to support a rider and comprising two floats, means connecting said floats together, one behind the other, for relative vertical swinging movement, the centers of buoyancy of said floats being so spaced apart that the rider can stand on the glider with one foot approximately on the centers of buoyancy of each float, whereby he can tip said floats alternately in a forward direction by shifting a substantial part of his weight from one foot to the other, a third float of less buoyancy than the other two and connected to the forward edge of the front float for vertical swinging movement relatively thereto, and a handle connected with said third float and extending into such a position as to enable the rider to operate it conveniently while standing in said position.

7. An article according to preceding claim 2, in which one at least of said floats is provided at its opposite lateral edges with substantially rigid upwardly extending wings, the means connecting said floats being constant and arranging for the folding of one float upon the other, and means for securing said wings to their respective float so that they can be folded upon it.

8. An article according to preceding claim 5, in which upwardly extending wings are fastened to the opposite lateral edges of each of said first two floats where they afford lateral stability to the glider, the means for connecting all of said floats together being constructed and arranged to enable them to be folded, one upon the other, and means for securing said wings to their respective floats so that they can also be folded upon the latter and the entire glider thus can be disposed in a compact form for transportation.

9. A water locomotion device adapted to support a rider and including at least two sections having plane surfaces, means connecting said sections together, one behind the other, for relative swinging movement out of alignment above or below a plane containing the corresponding surfaces of said sections, each section being of such buoyancy that it may be made to dive by a shifting of the weight of the rider thereon, and the centers of buoyancy of said sections being so spaced apart that a rider can stand on them with his feet approximately on the centers of buoyancy, respectively, of the sections, whereby the rider can, by shifting his weight alternately from one of said sections to the other, change the inclination of the sections in such a manner as to propel the glider.

JASPER WHITING.

CERTIFICATE OF CORRECTION.

Patent No. 2,195,527. April 2, 1940.

JASPER WHITING.

It is hereby certified that error appears in the printed specification of the above numbered patent requiring correction as follows: Page 1, first column, lines 38 and 39, strike out the words "into positions above and below their common plane of horizontal alignment" and insert the same after "movement" and before the period in line 37; and that the said Letters Patent should be read with this correction therein that the same may conform to the record of the case in the Patent Office.

Signed and sealed this 11th day of June, A. D. 1940.

(Seal)

Henry Van Arsdale,
Acting Commissioner of Patents.